United States Patent
Bhushan et al.

(10) Patent No.: US 12,347,463 B1
(45) Date of Patent: Jul. 1, 2025

(54) HEAD HEALTH MONITOR TRIGGERED DATA FIELD INTEGRITY CHECK

(71) Applicant: Seagate Technology LLC, Fremont, CA (US)

(72) Inventors: Sandeep Bhushan, Longmont, CO (US); Carl Stephen Arnold, Ontario (CA); Deepak Prakash, Shakopee, MN (US); Vidur Parkash, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 18/651,507

(22) Filed: Apr. 30, 2024

(51) Int. Cl.
*G11B 5/55* (2006.01)
*G06F 3/06* (2006.01)
*G11B 25/04* (2006.01)
*G11B 27/36* (2006.01)

(52) U.S. Cl.
CPC ............ *G11B 27/36* (2013.01); *G11B 25/043* (2013.01); *G11B 2220/2516* (2013.01)

(58) Field of Classification Search
CPC .............. G11B 5/5534; G11B 20/1816; G11B 20/10009; G11B 5/5504; G06F 3/0616; G06F 3/0653; G06F 3/0682; G06F 3/0617; G06F 11/0793; G06F 11/0727; G06F 11/0751
USPC .......................................................... 360/65
See application file for complete search history.

(56) References Cited

U.S. PATENT DOCUMENTS

| | | | |
|---|---|---|---|
| 9,336,831 B2 | 5/2016 | Burnett et al. | |
| 9,396,750 B2 | 7/2016 | Chu et al. | |
| 9,536,550 B1 | 1/2017 | Ma et al. | |
| 9,658,784 B1* | 5/2017 | Ahmad | G06F 3/0653 |
| 10,043,540 B1 | 8/2018 | Yang | |
| 2019/0303034 A1 | 10/2019 | Gaertner | |

* cited by examiner

*Primary Examiner* — Nabil Z Hindi
(74) *Attorney, Agent, or Firm* — HOLZER PATEL DRENNAN

(57) ABSTRACT

Read and write transducer elements have very high reliability for most of their respective lives. Only a small percentage of transducer elements fail after a significant duration of operation in the field, but failure rate ramps up significantly with as the transducer elements age, particularly with heavy read and write use. Prior solutions to this problem involve regularly running data field integrity checks. However, the data field integrity checks are resource intensive and yield significant latency impacts. The presently disclosed technology renders data field integrity checks (that come with high latency costs) dependent upon periodic or continuous head health monitoring schemes (that come with low latency costs). The data field integrity checks are triggered by a "poor health" signal generating from the head health monitoring schemes rather than being continuously or periodically performed with no regard to projected head health.

20 Claims, 3 Drawing Sheets

HEAD HEALTH MONITOR TRIGGERED DATA FIELD INTEGRITY CHECK

BACKGROUND

A hard disc or disk drive (HDD), hard disc or disk, or hard drive, is an electro-mechanical data storage device that stores and retrieves digital data using magnetic storage on one or more rigid rapidly rotating platters coated with magnetic material. The platters are paired with magnetic heads, each including a read transducer element and a write transducer element. The magnetic heads are usually arranged on a moving actuator arm, which read and write data to the platter surfaces using the read and a write transducer elements, respectively. Areal density is a measure of the quantity of information bits that can be stored on a given length of track, area of surface, or in a given volume of a computer storage medium. In terms of magnetic storage on a platter, areal density is generally measured in bits per length of track. Generally, higher areal density is more desirable, for it allows more data to be stored in the same physical space. Areal density therefore has a direct relationship to storage capacity of a given medium.

With areal density increases, the read and a write transducer elements become progressively smaller in dimension and increasingly prone to failure as a function of a lifetime workload (i.e., read and write operations over the life of an associated HDD). Especially in the case of write transducer failures, an absence of any leading sign of the failure can result in a field condition called "Don't write, don't tell", where the host is unaware data was written poorly. This condition is particularly problematic in that it not only generates erroneous write operations (i.e., yield data miscompare errors), but the host is unaware of the erroneous write operations and thus cannot take remedial action. If left unchecked, this can yield a loss of customer data. Prior solutions to this problem have significant latency impacts on HDD performance, which have precluded widespread adoption of such solutions.

SUMMARY

Implementations described and claimed herein address problems in the prior art by providing a method of monitoring transducer head health in a hard disc drive (HDD). The method comprises running a transducer health check at a first frequency and running a data integrity check of data written by a write transducer embedded within the transducer head at a second frequency. Responsive to a flag generated by the transducer health check indicating that the projected remaining life of the write transducer is below a threshold, increasing the frequency of the periodic data integrity check to a third frequency.

Other implementations are also described and recited herein.

DETAILED DESCRIPTION

Read and write transducer elements (near-field transducers) have very high reliability for most of their respective lives. Only a small percentage of transducer elements fail after a significant duration of operation (e.g., 3-5 years) in the field, but failure rate ramps up significantly as the read and write transducer elements age beyond 5 years, particularly in HDDs with heavy read and write use. Prior solutions to this problem involve regularly running data field integrity checks on data read from and written to an HDD. However, the data field integrity checks are resource intensive and yield significant latency impacts on HDD performance.

Using the failure characteristic noted above, the presently disclosed technology renders data field integrity checks (that come with high latency costs) dependent upon periodic or continuous head health monitoring schemes (that come with low latency costs). The data field integrity checks are triggered by a "poor health" signal generating from these monitoring schemes rather than being continuously or periodically performed with no regard to projected head health. The presently disclosed high-fidelity head health monitoring schemes run in parallel with regular operation of an HDD in the field, and thus provide a continuously up-to-date and reliable indication of head health, which can be used to trigger data integrity checks only when deemed necessary.

The presently disclosed solutions avoid latency impacts on the vast majority of transducer elements that last for the entire lifespan of an associated HDD. For the relatively small percentage of transducer elements that show in-field degradation during the lifespan of the associated HDD, the presently disclosed solutions avoid latency impacts on such transducer elements until they are expected to start degrading. Also, when transducer elements do begin to degrade, data integrity checks are surgically applied to avoid losing/returning bad data at our customers so long as the degrading transducer elements remain in service. The net effect of this is that the presently disclosed solutions enable strategically selected data integrity checks that avoid severe latency impacts and avoid data loss caused by degrading transducer elements. Further, the presently disclosed solutions can give early warning of impending issues with transducer elements that can trigger remedial actions (e.g., an in-field electronic depop of problematic transducers) prior to any data loss. In sum, presently disclosed solutions improve field reliability and result in increased customer confidence in equipped HDDs, especially for new recording technologies that may decrease transducer element expected life. For example, a 30 TB drive may reduce 5-year failure rates by 3-5% using the presently disclosed solutions.

Figure 1:
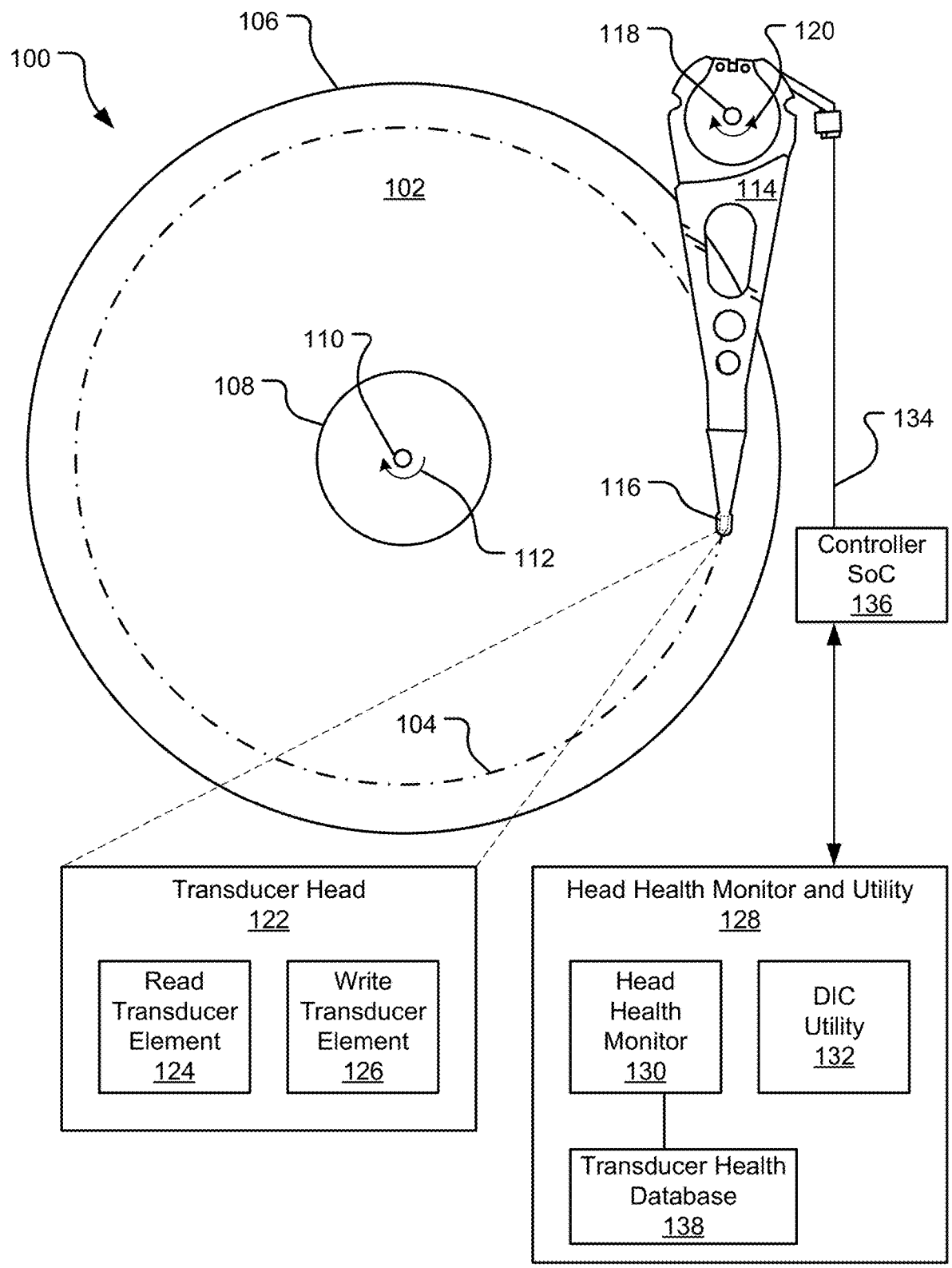
FIG. 1 illustrates an example hard disc drive (HDD) including a set of transducer heads, each with a read transducer element and a write transducer element, and a head health monitor and utility tasked with monitoring and detecting an impending failure of one or both of the transducer elements.

FIG. 1 illustrates an example hard disc drive (HDD) 100 including a set of transducer heads (e.g., transducer head 122), each with a read transducer element 124 and a write transducer element 126, and a head health monitor and utility 128 tasked with monitoring and detecting an impending failure of one or both of the transducer elements 124, 126. Storage platter 102 includes an outer diameter 106 and an inner diameter 108 between which are a number of substantially circular data tracks running in a spiral arrangement making up an entirety of the readable and/or writable surface area of the storage platter 102. Specific locations on the storage platter 102 may be defined by any available addressing scheme (e.g., cylinder-head-sector (CHS) addressing and logical block addressing (LBA) schemes). The storage platter 102 rotates at high speed about platter spindle 110 (as illustrated by arrow 112) as information is written to and/or read from data tracks (e.g., track 104) on the storage platter 102.

Information may be written to and read from the storage platter 102 via the actuator arm 114 and its respective slider 116. More specifically, the actuator arm 114 pivots about actuator spindle 118 using a first servo motor (or voice-coil motor (VCM), not shown) during a seek operation to locate a desired data track 104 on the storage platter 102, as illustrated by arrow 120. The actuator arm 114 extends toward the storage platter 102 and the slider 116 is located at an end of the actuator arm 114 distal from the actuator spindle 118. The slider 116 aerodynamically creates an air-bearing between the slider 116 and the spindle 118 as the slider 116 flies in close proximity above the storage platter 102 while reading data from and/or writing data to the depicted top surface of the storage platter 102.

The storage platter 102 includes an array of embedded independent magnetic domains and the slider 116 includes an array of microelectronic components within or adjacent to the transducer head 122. At least the read transducer element 124 and the write transducer element 126 are embedded within the transducer head 122. Thermal actuators, other head-media spacing micro-actuators, etc., not shown, may also be embedded within or adjacent to the transducer head 122. The read transducer element 124 is magneto-resistive, which allows it to read data from the magnetic domains on the storage platter 102 as they pass underneath the read transducer element 124. The write transducer element 126 generates magnetic fields that selectively change polarity of the magnetic domains of the storage platter 102 as they pass underneath the write transducer element 126, which allows the write transducer element 126 to write data to the storage platter 102.

A flex cable 134 provides electrical connection paths from a controller system-on-chip (SoC) 136 to the various microelectronic components attached to the actuator arm 114 and the slider 116. The flex cable 134 transmits data signals from the transducer head 122, while allowing pivotal movement of the actuator arm 114 during operation. The HDD 100 may include a number of additional components that allow the HDD 100 to function properly that are not shown for clarity purposes (e.g., a head-gimbal assembly that defines a desired head-media spacing).

The head health monitor and utility 128 runs in HDD 100 firmware and is tasked with managing operation of a head health monitor 130 and a data integrity check (DIC) utility 132 through the controller SoC 136. As the head health monitor 130 and the DIC utility 132 run periodically rather than continuously, the head health monitor and utility 128 manages the timing and frequency of operation of the head health monitor 130 and the DIC utility 132. In other implementations, the head health monitor 130 may run continuously and thus the head health monitor and utility 128 manages the timing and frequency of operation of the DIC utility 132 only based on feedback from the continuously running head health monitor 130.

The head health monitor 130 is an artificial neural network (NN) and/or machine-learning (ML) enabled predictor of transducer health and potential imminent failure (or failure predictor). The head health monitor 130 is trained by a transducer health database 138, which is made of up currently in-service and/or previously in-service transducers similar to one or both of the transducer elements 124, 126. The transducer health database 138 contains information regarding the lifespan and characteristics leading up to failure for the currently in-service and/or previously in-service transducers. Example factors unique to each tracked transducer in the transducer health database 138 include: I/O lifetime operations, time in service, power consumption over time, error rate over time, etc., In some implementations, the transducer health database 138 is built by artificially accelerating the life of some or all of the transducers within the database to failure. In some implementations, the head health monitor 130 uses at least changes in power consumption and error rate of the transducer elements 124, 126 over time to project the remaining life of the transducer elements 124, 126. The transducer health database 138 may also be continuously and iteratively updated as currently in-service transducers exit service, particularly if due to a failure, and as new transducers enter service.

In an example implementation, the head health monitor 130 utilizes a H2SAT decision tree referencing the transducer health database 138 as training data as a predictor of transducer health and potential imminent failure. The H2SAT decision tree may utilize three layers (6-6-3), 18 inputs, and 1 output, for example. The head health monitor 130 uses the data within the transducer health database 138, particularly that predicting imminent failure (e.g., a rapid rise in power consumption or error rate) to predict the health and potential imminent failure of transducers, such as the transducer elements 124, 126, that are currently in-service. In various implementations, the head health monitor 130 generates parametric statistical models that are effective at predict the health and potential imminent failure of transducers, using the data within the transducer health database 138 and trains the NN/ML model using the parametric statistical models to predict transducer health and identify imminent failures.

Identification of transducer health may be expressed by the head health monitor 130 as a percentage of remaining life specific to each tracked transducer and imminent failures may be identified by the percentage of remaining life falling below a threshold (e.g., 50%). Once a transducer falls below the threshold, the head health monitor 130 may trigger a flag to indicate that a transducer has a percentage of remaining life below the threshold target or that failure of the transducer is considered imminent. In other implementations, the transducer health and/or imminent failure may be expressed using different metric or measurements (e.g., bit error rate (BER), input/output operations per second (IOPS), expected I/O operations remaining till failure, etc.). In various implementations, the head health monitor 130 may be used to track the health of only write transducers, only read transducers, or both types (and potentially other types) of transducers.

The head health monitor 130 is initially set to run periodically at a first predefined frequency (e.g., once per 12 hours). Running the head health monitor 130 is considered herein to be a low latency cost task (i.e., a task unlikely to cause latency issues on the associated HDD 100) while being run. Accordingly, the first predefined frequency may be set to run as regularly as expected to potentially generate a statistically different result than an immediately prior iteration. Feedback from the head health monitor 130 is used to drive a frequency of operation of the DIC utility 132, which is considered herein to be a high latency task (i.e., a task likely to cause latency issues on the associated HDD 100) while being run.

The DIC utility 132 is capable of performing periodic data integrity checks to verify the performance of one or both of the transducer elements 124, 126. Typically, the data integrity check is performed by writing a known dataset to a scratchpad, reading the dataset back, and comparing the read data to the known dataset to confirm that the datasets are the same. If the datasets are the same, the data integrity check is considered "passed," while if the datasets are not the same, the data integrity check is considered "failed." In some cases, the data integrity check is repeated following a filed data integrity check to confirm the failed result.

In a more specific example, the DIC utility 132 is implemented in firmware and allows for confidence that even a degraded write transducer element 126 writes correctly. To achieve this, the DIC utility 132 tracks write commands to all heads independently and logs the write commands in a dynamic random-access memory (DRAM) scratchpad. Incoming read commands that do not overlap with the logged writes are allowed to execute normally. Incoming read commands that overlap with the logged writes are queued. While queued, the overlapping read commands trigger the DIC utility 132 to run a head diagnostic check. The head diagnostic check runs in the background (thus causing an impact on HDD 100 performance) and utilizes test tracks on the storage platter 102 to perform a write-read test using the scratchpad for comparison purposes. Failing the head diagnostic check triggers the DIC utility 132 to report to the host on read commands to the overlapping data.

The DIC utility 132 is also initially set to run periodically at second predefined frequency (e.g., once per 24 hours). In various implementations, the initial predefined frequency of the DIC utility 132 may be the same as or different from the head health monitor 130, but changes in the frequency of the DIC utility 132 is at least in part based on the output from the head health monitor 130. As running the DIC utility 132 is considered herein to be a high latency cost task, the second predefined frequency may not be set to run as regularly as would be necessary to catch a failing transducer prior to writing or reading a substantial quantity of erroneous data.

As the transducer elements 124, 126 are expected to have high reliability for the majority of the life of the HDD 100, the DIC utility 132 is expected to run at the second predefined frequency for a majority of the life of the HDD 100. Only as the lifespan of the HDD 100 and associated transducer elements 124, 126 comes to a close, is the DIC utility 132 frequency of operation generally increased. This maximizes the benefit of running the DIC utility 132 at the second predefined frequency. Feedback from the head health monitor 130 is used to drive an increase in frequency of operation of the DIC utility 132, particularly when the head health monitor 130 generates a flag or warning of impending transducer failure. As a result, the low latency head health monitor 130 is used to drive frequency of operation of the high latency DIC utility 132 so that the DIC utility 132 is not run excessively to cause overall latency issues with the HDD 100.

In various implementations, there may be two or more storage platters stacked and rotating together about the platter spindle 110. In such implementations, an actuator arm and its respective slider may be assigned to each of the stacked storage platters. For example, the actuator arm 114 and its respective slider 116 may read data from and/or write data to the storage platter 102, while another actuator arm and its respective slider may read data from and/or write data to another storage platter (not shown) stacked above or below the storage platter 102. In still further implementations, the HDD 100 includes a stacked array of any number of storage platters, each of which has an arm and a respective slider as described herein assigned to one or both surfaces (i.e., top and bottom surfaces) of the storage platters. In such cases, the head health monitor and utility 128 is capable of tracking transducer health of any one or more of the transducer elements embedded within the multiple transducer heads associated with the HDD 100.

Appearances of the storage platter 102, the actuator arm 114, the transducer head 122, and other features of the HDD 100 are for illustration purposes only and the features are not drawn to scale. Further, the various microelectronic components attached to the slider 116, including but not limited to the read transducer element 124 and the write transducer element 126, may be referred to in total as the transducer head or read/write head. Additional details regarding the transducer head 122 and various components and features thereof may be found elsewhere herein. Further, while the storage platter 102 is described herein as a spinning disc, in other implementations, the storage platter 102 may be replaced with a magnetic card or magnetic tape. Other implementations may also adopt non-magnetic data storage technologies, such as optical storage (e.g., CD-ROMs, DVDs, and Blu-ray discs) or semiconductor storage (e.g., flash memory).

Figure 2:
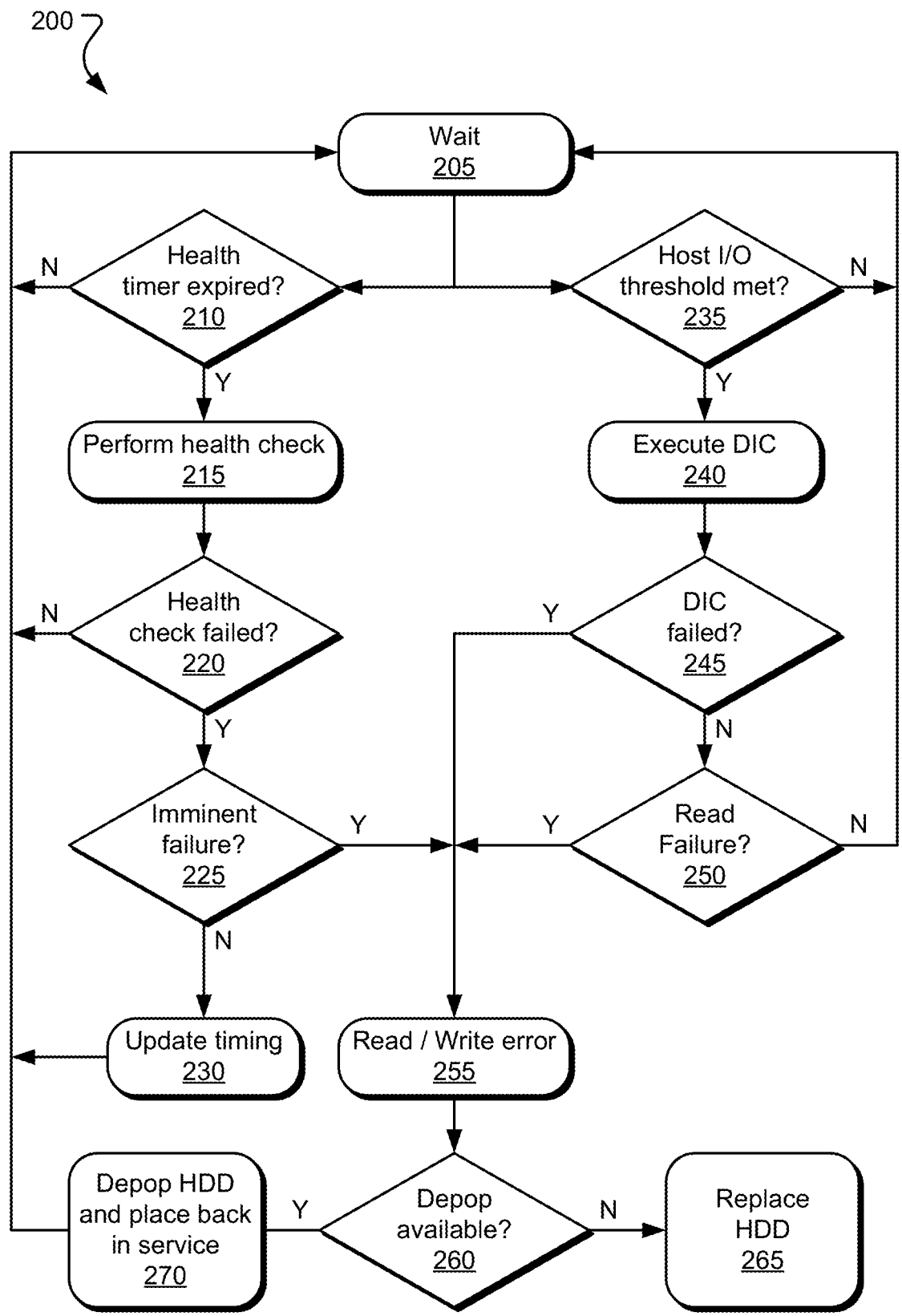
FIG. 2 illustrates example operations for operating a head health monitor and utility tasked with monitoring and detecting an impending failure of a transducer element within an HDD.

FIG. 2 illustrates example operations 200 for operating a head health monitor and utility tasked with monitoring and detecting an impending failure of a transducer element within an HDD. In various implementations, the transducer element that is the subject of the operations 200 is a write transducer element, a read transducer element, both read and write transducer element, and/or other transducers. The operations 200 are generally organized with head health monitor operations 205-230 running periodically and responsive to prior operations at a first frequency and data integrity check (DIC) utility operations 235-250 running periodically and responsive to prior operations at a second frequency. The second frequency is adjusted over time based on an output from the head health monitor operations 205-230, as discussed in further detail below. A waiting operation 205 generally executes in the background on firmware running the head health monitor and utility. The waiting operation 205 executes until a health timer for executing the head health monitor operations 205-230 expires or an input/output (IO) threshold is met that triggers the DIC utility operations 235-250. Decision operation 210 determines if the health timer has expired. If not, the waiting operation 205 continues. The health timer defines the first frequency for periodically executing the head health monitor operations 205-230. Once the health timer has expired, the head health monitor runs a transducer health check 215. This involves consulting a transducer health database, which is made of up currently in-service and/or previously in-service transducers and running NN and/or ML enabled predictor of transducer health and potential imminent failure. Decision operation 220 determines if the transducer health check 215 failed. If not, the waiting operation 205 restarts and the decision operation 210 continues iteratively.

If the transducer health check 215 fails, decision operation 225 determines if a failure is imminent. If not, then update timing operation 230 runs to increase the frequency of the DIC utility operations 235-250 from the second frequency to a third frequency (further, third to fourth frequencies, fifth to sixth frequencies, and so on for tracking multiple transducers) by decreasing a host I/O threshold. In various implementations, the update timing operation 230 involves the head health monitor setting a flag or sending a warning that the projected remaining life of the transducer is below a threshold. In some implementations, the update timing operation 230 may also decrease a duration of the timer used in the decision operation 210 to allow for additional iterations of the transducer health check 215. If the decision operation 225 determines that a failure is imminent, the head health monitor and utility returns a read/write error 255 to the host.

Running in parallel with the decision operation 210, decision operation 235 determines if host I/O requests to the transducer element (e.g., 1M logical block address (LBA) writes or reads) have been met. If not, the waiting operation 205 continues. The host I/O requests defines the second frequency for periodically executing the DIC utility operations 235-250. While the timer is used to trigger the decision operation 210 and the host I/O requests are used to trigger the decision operation 235 in FIG. 2, other implementations may use the host I/O requests to trigger the decision operation 210 and the timer to trigger the decision operation 235. Still further implementations may use the timer or the host I/O requests to trigger both the decision operations 210, 235.

Once the host I/O request threshold has been met, a DIC utility executes a DIC 240. This involves writing a known dataset to a scratchpad, reading the dataset back, and comparing the read data to the known dataset to confirm that the datasets are the same. Decision operation 245 determines if the DIC 240 failed by not returning datasets that match. If not, decision operation 250 determines in the read transducer specifically has failed (e.g., via an unrecovered error seen on a read command), which may not be definitively indicated by the decision operation 245. If not, the waiting operation 205 restarts and the decision operation 235 continues iteratively.

If the decision operation 245 indicates that the DIC failed, this indicates a failure of the read transducer element and/or the write transducer element. If the decision operation 250 indicates a read failure (a read element check), this indicates that the read element failed, as opposed to the write element. Regardless, if either or both of the decision operations 245, 250 fail, the head health monitor and utility returns the read/write error 255 to the host. Decision operation 260 determines if the HDD is eligible for reformatting/depopulation (depopping) to take the failed transducer element out of service but maintain the remainder of the HDD in service. If not, replace HDD operation 265 marks the drive for replacement. If so, the HDD is depopped and placed back into service with a reduced capacity in operation 270. The waiting operation 205 restarts and the decision operations 210, 235 continue iteratively to determine if the depopping was successful in resolving the read/write error 255. In some cases, the decision operation 260 is dependent upon whether a depopping was previously performed, and how recently.

Figure 3:
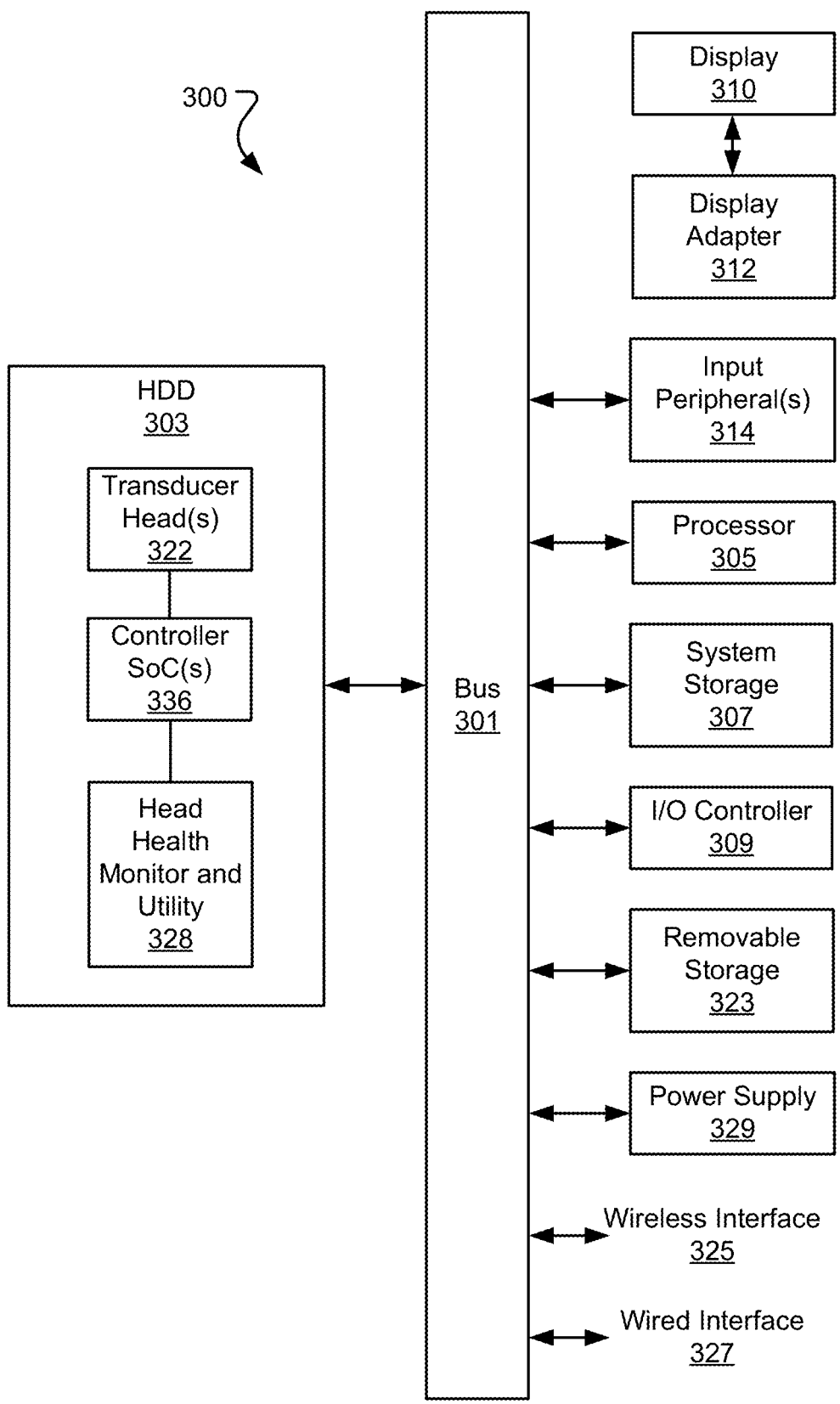
FIG. 3 illustrates an example system diagram of a computer system suitable for executing a head health monitor and utility tasked with monitoring and detecting an impending failure of one or more transducer elements within an HDD.

FIG. 3 illustrates an example system diagram of a computer system 300 suitable for executing a head health monitor and utility 328 tasked with monitoring and detecting an impending failure of one or more transducer elements embedded within a transducer head 322 of an HDD 303. HDD 303 includes a series of storage media platters (not shown, see e.g., storage platter 102 of FIG. 1), each of which is accessible via transducer head(s) 322 and associated controller SoC(s) 336. The transducer head(s) 322 include at least a read transducer element and a write transducer element as described in detail above.

The computer system 300 manages access to the HDD 303 and includes a bus 301, which interconnects major subsystems such as a processor 305, system storage 307 (such as random-access memory (RAM) and read-only memory (ROM)), an input/output (I/O) controller 309, removable storage (such as a memory card) 323, a power supply 329, and external devices such as a display screen 310 via a display adapter 312, and various input peripherals 314 (e.g., a mouse, trackpad, keyboard, touchscreen, joystick, and/or smart card acceptance device). Wireless interface 325 together with a wired network interface 327, may be used to interface to the data storage network and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 3 to be present to practice the presently disclosed technology. Furthermore, devices and components thereof may be interconnected in different ways from that shown in FIG. 3. Code (e.g., computer software, including mobile applications (apps) to implement the presently disclosed technology may be operably disposed in the system storage 307, removable storage 323, and/or the HDD 303, in firmware and/or software thereon.

The computing system 300 may include a variety of tangible computer-readable storage media (e.g., the system storage 307, the removable storage 323, and the HDD 303) and intangible computer-readable communication signals. Tangible computer-readable storage can be embodied by any available media that can be accessed by the computing system 300 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information, and which can be accessed by the computing system 300.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary implementations of the presently disclosed technology. Since many implementations of the presently disclosed technology can be made without departing from the spirit and scope of the invention, the presently disclosed technology resides in the claims hereinafter appended. Furthermore, structural features of the different implementations may be combined in yet another implementation without departing from the recited claims.

What is claimed is:

1. A method of monitoring transducer head health in a hard disc drive (HDD) comprising:
running a transducer health check at a first frequency;
running a data integrity check of data written by a write transducer embedded within the transducer head at a second frequency; and
responsive to a flag generated by the transducer health check indicating that a projected remaining life of the write transducer is below a threshold, increasing the frequency of the data integrity check to a third frequency.

2. The method of claim 1, further comprising:
running a data integrity check of data read by a read transducer embedded within the transducer head at a fourth frequency; and
responsive to a flag generated by the transducer health check indicating that the projected remaining life of the read transducer is below a threshold, increasing the frequency of the data integrity check of data read by the read transducer to a fifth frequency.

3. The method of claim 1, wherein the head health monitor is a neural network (NN) or machine-learning (ML) enabled failure predictor trained on a database of prior transducer head failures.

4. The method of claim 1, wherein the head health monitor utilizes at least changes in power consumption and error rate of the write transducer over time to project the remaining life of the write transducer.

5. The method of claim 1, wherein the flag further indicates a predicted imminent failure of the write transducer.

6. The method of claim 1, further comprising:
responsive to failure of the data integrity check, returning a write error to a host.

7. The method of claim 6, further comprising:
responsive to the write error, taking the write transducer out of service and reformatting the HDD for operation without the write transducer.

8. The method of claim 6, further comprising:
responsive to the write error, replacing the HDD.

9. A hard disc drive (HDD) comprising:
a write transducer embedded within a transducer head of the HDD; and
a head health monitor and utility including:
a head health monitor to run a transducer health check at a first frequency;
a data integrity check (DIC) utility to run a data integrity check of data written by the write transducer at a second frequency, wherein responsive to a flag generated by the transducer health check indicating that a projected remaining life of the write transducer is below a threshold, the head health monitor and utility to increase the frequency of the data integrity check to a third frequency.

10. The HDD of claim 9, further comprising:
a read transducer embedded within the transducer head of the HDD, wherein:
the DIC utility is further to run a data integrity check of data read by the read transducer at a fourth frequency; and
responsive to a flag generated by the transducer health check indicating that the projected remaining life of the read transducer is below a threshold, the head health monitor and utility to increase the frequency of the data integrity check of data read by the read transducer to a fifth frequency.

11. The HDD of claim 9, wherein the head health monitor is a neural network (NN) or machine-learning (ML) enabled failure predictor trained on a database of prior transducer head failures.

12. The HDD of claim 9, wherein the head health monitor utilizes at least changes in power consumption and error rate of the write transducer over time to project the remaining life of the write transducer.

13. The HDD of claim 9, wherein the flag further indicates a predicted imminent failure of the write transducer.

14. The HDD of claim 9, further comprising:
responsive to failure of the data integrity check, returning a write error to a host.

15. The HDD of claim 14, further comprising:
responsive to the write error, taking the write transducer out of service and reformatting the HDD for operation without the write transducer.

16. The HDD of claim 14, further comprising:
responsive to the write error, replacing the HDD.

17. A method of monitoring transducer head health in a hard disc drive comprising:
- running a transducer health check at a first frequency;
- running a data integrity check of data written by a write transducer embedded within the transducer head at a second frequency;
- responsive to a first flag generated by the transducer health check indicating that a projected remaining life of the write transducer is below a threshold, increasing the frequency of the data integrity check to a third frequency;
- running the data integrity check of data written by the write transducer at the third frequency;
- responsive to a second flag generated by the transducer health check indicating that the write transducer will imminently fail, returning a write error to a host.

18. The method of claim 17, further comprising:
- responsive to failure of the data integrity check, returning a write error to the host.

19. The method of claim 17, further comprising:
- running a data integrity check of data read by a read transducer embedded within the transducer head at a fourth frequency; and
- responsive to a third flag generated by the transducer health check indicating that the projected remaining life of the read transducer is below a threshold, increasing the frequency of the data integrity check of data read by the read transducer to a fifth frequency;
- running the data integrity check of data read by the read transducer at the fifth frequency; and
- responsive to a fourth flag generated by the transducer health check indicating that the read transducer will imminently fail, returning a write error to the host.

20. The method of claim 19, further comprising:
- running a read element check; and
- responsive to failure of the read element check, returning a read error to the host.

* * * * *